June 11, 1957     E. L. SCHLAGE     2,795,447
BEARING AND SPINDLE STRUCTURE FOR DOOR LOCKS
Filed May 18, 1954     2 Sheets-Sheet 1

FIG. I.

INVENTOR.
ERNEST L. SCHLAGE
BY
Boyken, Mohler & Wood.

INVENTOR.
ERNEST L. SCHLAGE
BY
Boy Ken, Mohler & Wood.

United States Patent Office 2,795,447
Patented June 11, 1957

2,795,447

BEARING AND SPINDLE STRUCTURE FOR DOOR LOCKS

Ernest L. Schlage, Burlingame, Calif., assignor to Schlage Lock Company, a corporation Application May 18, 1954, Serial No. 430,697

8 Claims. (Cl. 292—169)

This invention relates to door locks of the split spindle type, and especially to means for supporting the inner ends of the spindles, and for securing the spindles against endwise removal from the lock.

In door locks employing a single spindle, it is a simple matter to properly support and secure the spindle as there are bearings one on each side of the door provided for that purpose, however, when a split spindle or in other words, where two spindles are employed and where they are inserted from opposite sides of the door lock only one bearing is available for each spindle, and while that is sufficient in certain types of door locks, it would obviously be more desirable if two or more bearings could be provided for each spindle, this being particularly true where alignment and a close fit with coacting mechanism is essential.

The present invention has as an object a structure which provides three bearings for each spindle, that is, in addition to the conventional single bearing formed in the clamping or escutcheon plates, two closely spaced bearings are provided for the inner end of each spindle. The invention more specifically stated embodies a lock housing having a bearing on each side thereof, and within the housing a bearing plate having a bearing on each side thereof, thus providing two closely spaced bearings for the inner end of each spindle in addition to the exterior escutcheon or clamping plate bearings; further, the invention provides means for securing the spindles against endwise removal from the lock and for limiting rotational movement of the spindles within the housing, and with relation to retracting mechanism actuated thereby, and in addition thereto the bearing plate functions as a thrust plate to limit inward movement of the spindles.

The invention is shown by way of illustration in the accompanying drawings, in which.

Figure 1:
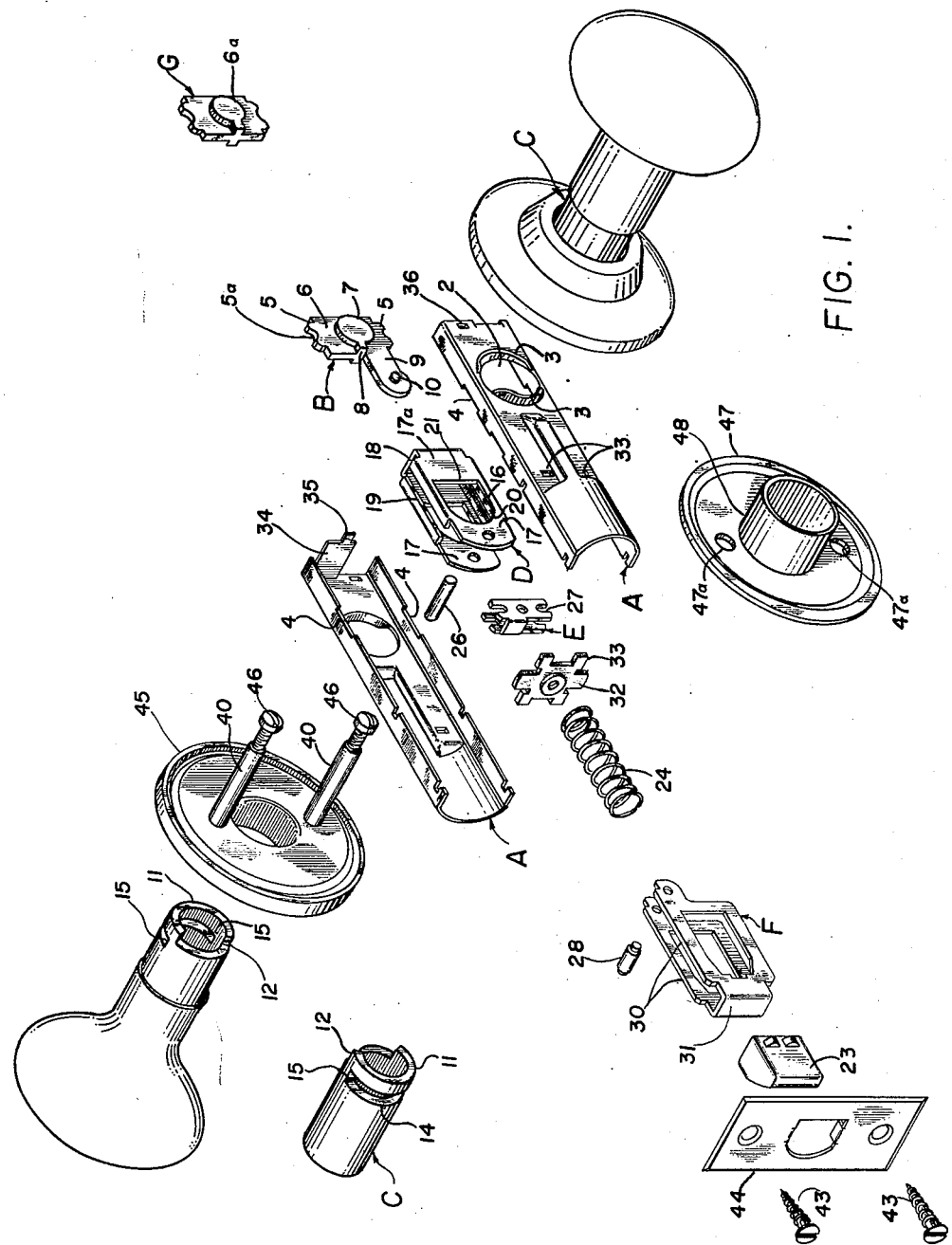
Fig. 1 is a perspective view showing all the parts of the door lock spread out and separated with relation to each other.

Referring to the drawings in detail, A—A indicates a lock housing which is divided longitudinally into two halves, see Fig. 1 to facilitate placing and assembly of mechanism to be housed therein. Formed in each half of the housing is an opening 2 which has outwardly extending flanges 3—3 to form a spindle bearing. Also formed in each half of the housing are notches 4—4 which are provided for the reception of lugs 5—5 formed on a bearing plate generally indicated at B. The bearing plate has a circular bearing boss 7 formed on each side thereof, and on its forward edge a stop lug 8. The bearing plate also has a forwardly extending arm 9 formed thereon which carries a pin 10. The opposite faces of the bearing plate are flat to form a guide for a retractor hereinafter to be described.

The spindles employed are of tubular form as shown at C, and they are identical in construction. Each spindle has an extended portion 11 at its inner end to form a pair of shoulders 12—12 which are engageable with the stop lug 8 to limit rotation of the spindles to approximately a quarter turn. Each spindle is also provided with a cross slot 14 adjacent the inner end to form a pair of shoulders 15—15 which function as roll back members. Otherwise, each spindle is provided with a knob which may be secured on the respective spindles in any suitable manner.

The reference character D indicates in general a latch bolt retractor. The retractor consists of a pair of spaced apart side plates 17—17 joined at the rear by an end plate 18. The retractor straddles the bearing plate B and is provided with top and bottom flanges 19 which engage the flat opposed faces of the bearing plate and as such guides the retractor when reciprocal movement is imparted thereto by the roll back members. An elongated opening 16 is formed in each side plate 17 of the retractor, each opening being rounded at the forward end, as indicated at 20 to fit the contour or exterior surface of a spindle, and presents a vertical face 21 at the rear which is engaged or acted upon by the roll-back members as will hereinafter be described.

Figure 2:
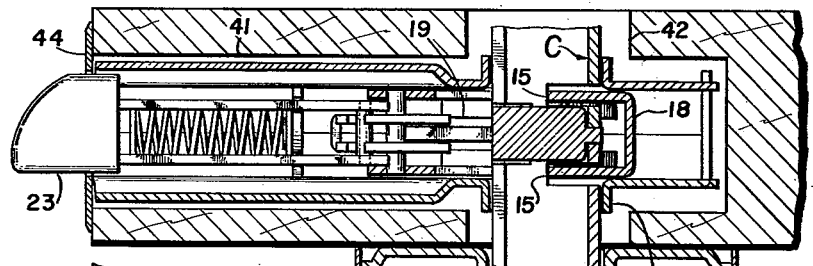
Fig. 2 is a horizontal longitudinal section of the lock showing it in position in a door.
Figure 3:
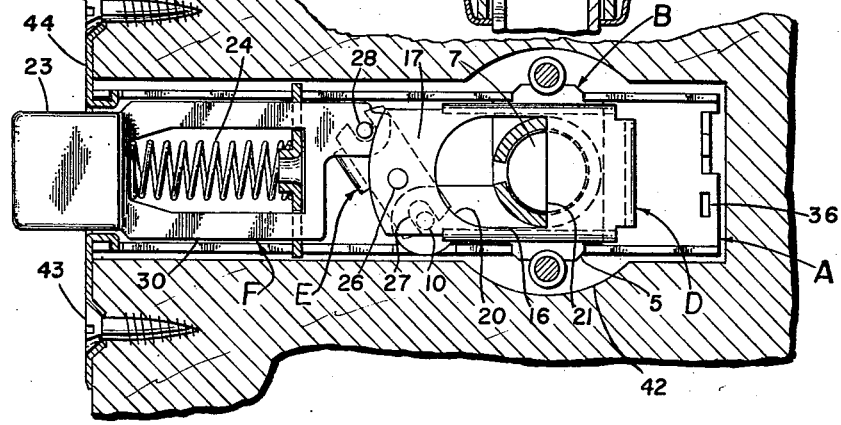
Fig. 3 is a vertical longitudinal section of the lock showing the latch bolt in extended position.
Figure 4:
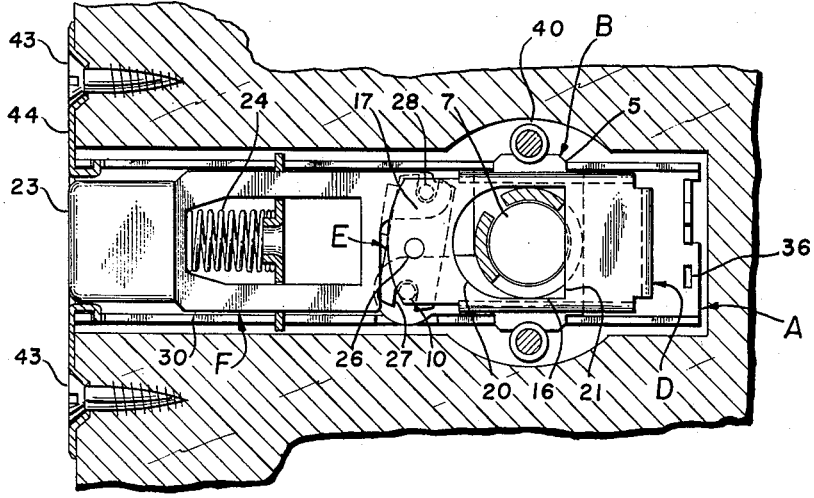
Fig. 4 is a section similar to Fig. 3 showing the latch bolt in retracted position.

The roll-back members and the retractor are, of course, provided for the purpose of retracting a latch bolt indicated at 23, and a spring 24 returns or restores the latch bolt to extended position. The distance the latch bolt moves during retraction or extension should under usual conditions be no less than three one-eighths of an inch so as to insure engagement of the latch bolt with its keeper or striker plate when it is fully projected; this three one-eighths of an inch movement being essential to take care of the space between the edge of the door and the jamb, where a door is poorly fitted or where considerable shrinkage has taken place between the door and the jamb. Where comparatively large diameter spindles are employed the required movement may be obtained by approximately a one-quarter turn of the knob, but where smaller diameter spindles are employed the required movement of the latch bolt cannot be obtained except by further rotation of the knob. In such cases and as here illustrated a movement multiplying lever is required and is interposed between the retractor and the latch bolt. Such a multiplying lever is generally indicated at E Fig. 1, and is also shown in Figs. 2, 3 and 4. The multiplying lever is centrally pivoted on a pin 26 carried by the retractor D. A slot 27 is formed in the lower end of the multiplying lever and straddles pin 10 carried by arm 9. The upper end of the multiplying lever is similarly slotted and straddles a pin 28 carried by a slide member F which in turn carries the latch bolt 23. It may be said that the slide is nothing but an extension of the latch bolt. It is formed from sheet metal in a manner similar to the rectractor, as it consists of a pair of side sections 30 connected by an end plate 31 to which the latch bolt is secured.

The slide straddles a plate 32 which serves three functions, first, it is support for one end of the spring 24, secondly, it is a guide for the slide and thirdly, it is provided with lugs 33 which secure the front end of the housing sections together when they are assembled.

By referring to Figs. 2, 3 and 4 the operation of the retracting mechanism will be briefly described. When a spindle is rotated in one direction or another by its knob, one of the rollback members 15 on the spindle will engage the vertical face 21 of the retractor D and force it rearwardly from the position shown in Fig. 3 to the position shown in Fig. 4. This movement of the retractor causes the multiplying lever to swing about pin 10 to assume the position shown in Fig. 4. During this movement the slide F and the latch bolt 23 is retracted due to engagement of the upper slotted end of the multiplying lever with pin 28. The spring 23 is at the same time compressed and when the knob is released all parts will be restored to normal projected position as shown in Fig. 3.

Arm 9, pins 10, 26 and 28 together with the multiplying lever may be entirely eliminated, if a larger, for instance one inch or more diameter spindle is employed, as the slide F and the retractor may then be made as a single unit, or the two units may be directly connected end to end when the roll-back members on a larger spindle impart the required movement.

The longitudinally divided housing sections, A—A when assembled contain the following mechanism. The bearing plate B, the retractor D, the multiplying lever E, plate 32, spring 24 and the slide F with the latch bolt 23 secured thereto. The two halves A—A of the housing are rigidly secured with relation to each other when assembled, first by the plate 32 which carries the lugs 33. These lugs project through slots 33ª formed in the respective halves of the housing. By bending or twisting the lugs the front ends of the housing sections become rigidly secured with relation to each other. Secondly, the rear end of each of the housing sections carries an end plate 34 and each end plate a lug 35. These lugs project through slots 36 formed in the respective halves of the housing and when the lugs are bent or twisted the rear or inner ends of the housing sections become rigidly secured, and the bearing plate B becomes clamped between the housing sections as the lugs 5 formed thereon project through the slots 4. These lugs are notched as at 5ª at their outer ends and serve another function to wit that of guides for a pair of posts 40—40 hereinafter to be described.

A lock of the type here shown requires the drilling of two holes in the door in which it is to be installed; one hole as indicated at 41 which is drilled through the outer edge of the door and a second hole indicated at 42 which is drilled transversely or through the opposite faces of the door. The housing A with its contained mechanism is inserted in the hole 41 and when fully inserted the spindle receiving openings at the rear or inner end of the housing will align with the hole 42. The housing is secured by means of screws 43 extending through a face plate 44 suitably secured to the outer end of the housing. A clamping plate 45 carrying a pair of posts 40—40 is next applied to the outer face of the door and in a position where the posts align and pass through the notches formed in the lugs 5 of the bearing plate; the screws 46 carried by the posts being first removed. A second clamping plate indicated at 47 is now applied to the opposite face of the door and in a position where holes 47ª formed therein align with the posts, when the screws 46 may be inserted and screwed up tight, thus securing the clamping plates rigidly against the opposite faces of the door. Each clamping plate has a hub 48 formed thereon which functions as an outer bearing for each spindle, and each clamping plate may be covered with an ornamental escutcheon plate which may be snapped on or secured in any suitable manner. Be that as it may, with the clamping plates in place and secured the only other operation required to complete installation is to insert the respective spindles. This is accomplished as follows: By referring to Fig. 4 it will be noted that the latch bolt 23 is shown in its depressed position. In this position it is impossible to either insert or remove a spindle, however, by applying finger pressure to the end of the latch bolt it is possible to further depress it and by doing so the retractor D moves rearwardly until the openings 16 formed in the side walls 17 of the retractor permits a spindle to be inserted, that is, a spindle when inserted will pass through the bearing boss 48 of an escutcheon plate and the spindle receiving opening 2 of the housing A, but it can enter no further, until finger pressure is applied to the latch bolt forcing it inwardly beyond its normal retracted position, as it is this further inward movement of the latch bolt which moves the retractor D far enough back to permit the inner end of the spindle to pass through the opening 16 formed in the side of the retractor and permits inner end of the spindle to telescope over the bearing boss 7 when final movement of the spindle is stopped by the side face of the bearing plate. By releasing finger pressure on the latch bolt, spring 23 returns it together with the retractor and connected mechanism to normal position as shown in Fig. 3, and the spindle which was just inserted is secured against removal. The means which secures the spindle against removal, see Figs. 1, 3 and 4 are the cheeks or the solid sections 17ª of the side walls of the retractor, that is, the sections of the side walls between the end wall 18 and vertical ends 21 of opening 16 of the retractor, as these cheeks enter the cross slots 14 of the spindle both in the fully projected and the depressed position of the latch bolt 23, see Figs. 3 and 4. It is only when the latch bolt is further depressed beyond its normal retracted position shown in Fig. 4 that the retractor is moved far enough to the rear to permit the cheeks to clear the cross slots in the spindles, and in this position either spindle may be inserted or removed, but in all other positions the cheeks enter the cross slots of the spindles a sufficient distance to prevent removal. Again the cheeks serve as blocks to prevent insertion of the spindles, except when depressed beyond the position shown in Fig. 4.

From the foregoing description it should be apparent that three bearings are provided for each spindle; two closely spaced bearings at the inner end of each spindle and a long, large bearing in the clamping plate hubs at the outer end of each spindle. The important bearings are the innermost bearings formed by the bearing bosses 7 and the clamping plate hub bearings. The bearings formed in the side walls of the housing A by means of the out-turned flanges 3—3 are not so important as it is the innermost and outermost bearings which maintain alignment and proper support for the spindles with relation to associated mechanism, in fact, the bearings in the side walls of the housing may be given so much clearance that they merely function to guide the inner end of each spindle to line up with the bearing bosses 7 while being inserted.

The bearing plate does not only provide bearings for the inner ends of the spindles, but it also takes up end thrust applied to the spindles, furthermore, the bearing plate forms a guide not only for the posts 40—40, but it also forms a guide for the retractor, and by providing the bearing plate with the arm 9 and pin 10, it forms a support for the multiplying lever when this is required. The arm 9 and pin 10 may be entirely eliminated and the bearing plate will assume the form shown at G, see Fig. 1 when a large diameter spindle is employed and the multiplying lever is not required. In some instances, a lock of this character may be actuated by a single spindle. For instance, in closet doors and the like, one knob and spindle may be used to open and close the door, and the knob and spindle on the inner face of the door may be eliminated as there is no need therefor. In such installations the bearing plate need have only one bearing boss 7 projecting from one face of the plate as there is only one spindle to be supported, otherwise the mechanism of the lock will be substantially the same as when a split spindle is used.

I claim:

1. In a door lock an elongated housing, said housing being divided longitudinally into two sections, and each section having a spindle receiving opening formed therein adjacent one end, a plate insertable between the housing sections and fixedly secured thereto, a bearing boss on each side of the plate, and aligning with the spindle receiving openings for rotatably receiving the adjacent inner ends of a pair of knob spindles, and means for securing the housing sections with relation to each other to secure the plate between the housing sections.

2. In a door lock an elongated housing, said housing being divided longitudinally into two sections, and each section having a spindle receiving opening formed therein adjacent one end, a plate mounted on said housing sections, a bearing boss on each side of the plate, and aligning with the spindle receiving openings for rotatably receiving the adjacent inner ends of a pair of knob spindles, and means for securing the housing sections with relation to each other to secure the plate between the housing sections, and a flange formed on each housing section around each spindle opening to form spindle bearings.

3. In a door lock, a housing, a spindle bearing in each side thereof, a plate secured to said housing midway between the spindle bearings, a bearing boss on each side of the plate and in alignment with the spindle bearings, and a pair of spindles disposed one on each side of the housing, said spindles having their inner ends supported by the bosses on the plate and also by the bearings in the housing, and stop means on the plate for limiting rotational movement of the spindles.

4. In a door lock, a housing, a spindle bearing in each side thereof, a plate in the housing midway between the spindle bearings, a bearing boss on each side of the plate and in alignment with the spindle bearings, and a pair of spindles disposed one on each side of the housing, said spindles having their inner ends supported by the bearing bosses on said plate and also by the bearings in the housing, a reciprocally mounted retractor straddling said plate and guided thereby, and means on the retractor for securing the spindles against endwise removal from the housing.

5. In a door lock, a housing, a spindle bearing in each side thereof, a plate in the housing midway between the spindle bearings, a bearing boss on each side of the plate and in alignment with the spindle bearings, and a pair of spindles disposed one on each side of the housing, said spindles having their inner ends supported by the bosses on said plate and also by the bearings in the housing, a retractor slidably mounted on and guided by said plate, a pair of roll-back members on each spindle engageable with the retractor to impart reciprocal movement thereto, a cross slot formed adjacent the inner end of the spindle, and means on the retractor extending into said cross slots and securing the spindles against endwise removal from the housing.

6. In a door lock that includes a pair of clamping plates adapted to be secured to opposite sides of a door and including a pair of clamping posts at right angles to said plates for so securing said plates: a latch bolt housing, a bearing plate within said housing, lugs on opposite ends of said plate and slots in said housing for receiving said lugs therethrough for releasably connecting said plate and housing, said lugs extending outwardly of said housing and provided with slots for engaging said clamping posts to provide guides therefor whereby said housing is supported by said posts against shifting relative thereto.

7. In a lock of the character described having a latch bolt housing a latch bolt retracting mechanism, and a pair of spindles: a plate extending longitudinally within said housing and fixed thereto, said plate being provided with bearing bosses on opposite sides thereof to rotatably receive the inner ends of said spindles, an extension on said plate extending longitudinally of said housing and provided with a fixed pivot pivotally connecting the same to said latch bolt retracting mechanism.

8. In a door lock, a latch bolt housing containing a latch bolt and the retracting mechanism therefor, a pair of spindles operatively connected at their inner ends to said mechanism, means secured to said housing between the inner ends of said spindle and formed to provide fixed bearings for rotatably supporting said inner ends, said means comprising a fixed plate pivotally supporting the inner end of said retracting mechanism, interengaging elements on said plate and said housing for fixedly securing the same together.

References Cited in the file of this patent

UNITED STATES PATENTS

| | | |
|---|---|---|
| 640,217 | Moore | Jan. 2, 1900 |
| 734,117 | Caley | July 21, 1903 |
| 855,679 | Voight | June 4, 1907 |
| 1,876,885 | Ellingson | Sept. 13, 1932 |
| 1,880,675 | Baume | Oct. 4, 1932 |
| 2,538,688 | Heyer | Jan. 16, 1951 |
| 2,568,273 | Clark | Sept. 18, 1951 |
| 2,629,250 | Schlage | Feb. 24, 1953 |
| 2,644,705 | Hagstrom | July 7, 1953 |
| 2,653,046 | Erkkila | Sept. 22, 1953 |